(12) United States Patent
Kim et al.

(10) Patent No.: US 9,601,789 B2
(45) Date of Patent: Mar. 21, 2017

(54) SELF-PUMPING MEMBRANELESS FUEL CELL

(75) Inventors: Chang-Jin Kim, Beverly Hills, CA (US); Janet Hur, Los Angeles, CA (US); Desheng Meng, Houghton, MI (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 1266 days.

(21) Appl. No.: 13/325,451

(22) Filed: Dec. 14, 2011

(65) Prior Publication Data
US 2012/0148931 A1    Jun. 14, 2012

Related U.S. Application Data

(60) Provisional application No. 61/422,989, filed on Dec. 14, 2010.

(51) Int. Cl.
| | |
|---|---|
| *H01M 8/04082* | (2016.01) |
| *H01M 8/04186* | (2016.01) |
| *H01M 8/2455* | (2016.01) |
| *H01M 8/24* | (2016.01) |
| *H01M 8/04* | (2016.01) |

(52) U.S. Cl.
CPC ... *H01M 8/04201* (2013.01); *H01M 8/04186* (2013.01); *H01M 8/2455* (2013.01); *H01M 8/2459* (2016.02); *Y02E 60/50* (2013.01)

(58) Field of Classification Search
CPC ........ H01M 8/04201; H01M 8/04186; H01M 8/2455; H01M 8/2459
See application file for complete search history.

(56) References Cited

U.S. PATENT DOCUMENTS

| | | |
|---|---|---|
| 7,976,286 B2 | 7/2011 | Kim et al. |
| 2008/0118790 A1 | 5/2008 | Kim et al. |

(Continued)

FOREIGN PATENT DOCUMENTS

WO   WO 2006083598   8/2006

OTHER PUBLICATIONS

Latorre, L. et al., Electrostatic Actuation of Microscale Liquid-Metal Droplets, Journal of Microelectromechanical Systems, vol. 11, No. 4, 302-308 (Aug. 2002).

(Continued)

*Primary Examiner* — Eugenia Wang
(74) *Attorney, Agent, or Firm* — Vista IP Law Group LLP (57) ABSTRACT

The present invention is directed to a device, and method of operation, for a fuel cell which uses bubble-based pumping to self-pump the fuel to the anode, and a single, common channel separating the anode from the cathode through which a mixed fuel and electrolyte flow. The fuel cell includes a single channel having two of its sides formed by the anode and the cathode, each having a suitable catalyst. A bubble generating region is formed in the anode and cathode reaction area of the channel. A one-way valve is located upstream of the bubble generating region. A vent for venting bubbles is disposed over a portion of the channel downstream of the bubble generating region. The fuel cell may be advantageously used to build miniature fuel cells for miniature electronic devices, or scaled to build larger fuel cells for larger electronic devices.

17 Claims, 8 Drawing Sheets

(56) References Cited

U.S. PATENT DOCUMENTS

2009/0092862 A1* 4/2009 Morris ............... H01M 8/1097
429/9
2009/0263700 A1* 10/2009 Jiang ................ H01M 8/04201
429/423

OTHER PUBLICATIONS

Christian, et al., Ceramic microreactors for on-site hydorgen production, Journal of Catalysis, 24:235-242 (2006).
Sung, I.K. et al., Tailored Macroporous SiCN and SiC Structures for High-Temperature Fuel Reforming, Adv. Funct. Mater 2005, 15, 1336-1342.
Tas, N.R. et al., Nanofluidic Bubble Pump Using Surface Tension Directed Gas Injection, Anal. Chem. 2002, 74, 2224-2227.
U.-C. Yi and C.-J. C. Kim, "Soft Printing of Droplets Pre-Metered by Electrowetting," Sensors and Actuators A, 2004, vol. 114, pp. 347-354.
K. Yoshida, Y. Hagihara, S. Tanaka, and M. Esashi, "Normally-Closed Electrostatic Micro Valve with Pressure Balance Mechanism for Portable Fuel Cell Application," Proc. IEEE Int. Conf. Micro Electro Mechanical Systems, Istanbul, Turkey, Jan. 2006, pp. 722-725.
S. Zimmermann, J. A. Frank, D. Liepmann, and A. P. Pisano, "A planar micropump utilizing thermopneumatic actuation and in-plane flap valves," Proc. IEEE Int. Conf. Micro Electro Mechanical System (MEMS 2004), Maastricht, The Netherlands, 2004, pp. 462-465.
"Press release: Toshiba Micro DMFC," http://www.toshiba.co.jp/about/press/2004_06/pr2401.htm, Jun. 24, 20014.
MTI micro fuel cell: "http://www.mtimicrofuelcells.com/".
A. Bazylak, D. Sinton, and N. Djilali, "Improved fuel utilization in microfluidic fuel cells: A computational study," Journal of Power Sources, 2005, vol. 143, pp. 57-66.
J. S. Boland, J. D. M. Messenger, H. W. Lo, and Y. C. Tai, "Arrayed Liquid Rotor Electret Power Generator Systems," Proc. The 18th IEEE Int. Conf. on Micro Electro Mechanical Systems, Miami, Florida, 2005, pp. 618-621.
C. R. Buie, Y. Banin, C. Tang, J. G. Santiago, F. B. Prinz, and B. L. Pruitt, "A Microfabricated Direct Methanol Fuel Cell with Integrated Electroosmotic Pump," Proc. The 19th IEEE Int. Conf. on Micro Electro Mechanical Systems, Istanbul, Turkey, 2006, pp. 938-941.
S. K. Cho, H. Moon, and C.-J. Kim, "Creating, Transporting, Cutting, and Merging Liquid Droplets by Electrowetting-Based Actuation for Digital Microfluidic Circuits," Journal of Microelectromechanical Systems, 2003, vol. 12, pp. 70-80.
E. R. Choban, L. J. Markoski, A. Wieckowski, and P. J. A. Kenis, "Microfluidic fuel cell based on laminar flow", Journal of Power Sources, 128 (2004) pp. 54-60.
E. R. Choban, J. S. Spendelow, L. Gancs, A. Wieckowski, and P. J. A. Kenis, "Membraneless laminar flow-based micro fuel cells operating in alkaline, acidic, and acidic/alkaline media," Electrochimica Acta, 2005, vol. 50, pp. 5390-5398.
E. R. Choban, P. Waszczuk, and P. J. A. Kenis, "Characterization of limiting factors of a laminar flow-based membraneless micro fuel cell," Electrochemical and Solid State Letters, 2005, vol. 8, pp. A348-A352.
] C.-H. Choi and C.-J. Kim, "Large Slip of Aqueous Liquid Flow over a Nanoengineered Superhydrophobic Surface," Physical Review Letters, 2006, vol. 96, pp. 066001-066004.
J. L. Cohen, D. A. Westly, A. Pechenik, and H. D. Abruna, "Fabrication and preliminary testing of a planar membraneless microchannel fuel cell," Journal of Power Sources, 2005, vol. 139, pp. 96-105.
S. F. J. Flipsen, "Power sources compared: the ultimate truth?," Journal of Power Sources, 2006 (in Press).
R. S. Jayashree, L. Gancs, E. R. Choban, A. Primak, D. Natarajan, L. J. Markoski, P. J. A. Kenis, "Air-breathing laminar flow-based microfluidic fuel cell", Journal of the American Chemical Society, 127 (2005), pp. 16758-16759.
R. S. Jayashree, D. Egas, D. Natarajan, J. S. Spendelow, L. J. Markoski, and P. J. A. Kenis, "Air-Breathing Laminar Flow-Based Direct Methanol Fuel Cell with Alkaline Electrolyte," Electrochemical and Solid State Letters, 2006, vol. 9, pp. A252-A256.
R. S. Jayashree, J. S. Spendelow, J. Yeom, C. Rastogi, M. A. Shannon, and P. J. A. Kenis, "Characterization and application of electrodeposited Pt, Pt/Pd, and Pd catalyst structures for direct formic acid micro fuel cells," Electrochimica Acta, 2005, vol. 50, pp. 4674-4682.
P. J. A. Kenis, R. F. Ismagilov, S. Takayama, G. M. Whitesides, and H. S. W. S. Li, "Microfabrication inside capillaries using fluid flow," Acc. of Chem. Res, 2000, vol. 33, pp. 841-847.
E. Kjeang, N. Djilali, and D. Sinton, "Microfluidic fuel cells: A review" Journal of Power Sources, 186 (2009), pp. 353-369.
J. Lee and C.-J. Kim, "Surface-Tension-Driven Microactuation Based on Continuous Electrowetting," J. Microelectromechanical Systems, 2000, vol. 9, pp. 171-180.
J. Lee, H. Moon, J. Fowler, T. Schoellhammer, and C.-J. Kim, "Electrowetting and electrowetting-on-dielectric for microscale liquid handling," Sensors and Actuators, 2002, vol. A95, pp. 259-268.
L. Lin, "Microscale Thermal Bubble Formation: Thermophysical Phenomena and Applications," Microscale Thermophysical Engineering, vol. 2, pp. 71-85, 1998.
J. W. Long, B. Dunn, D. R. Rolison, and H. S. White, "Three-Dimensional Battery Architectures," Chem. Rev., 2004, vol. 104, pp. 4463-4492.
G. Q. Lu, C. Y. Wang, T. J. Yen, and X. Zhang, "Development and characterization of a silicon-based micro direct methanol fuel cell," Electrochimica Acta, 2004, vol. 49, pp. 821.
D. D. Meng and C.-J. Kim, "An active micro-direct methanol fuel cell with self-circulation of fuel and built-in removal of CO2 bubbles", J. Power Sources, 194 (2009), pp. 445-450.
D. D. Meng and C.-J. Kim, "Micropumping of liquid by directional growth and selective venting of gas Bubbles", Lab on a Chip, 8 (2008), pp. 958-968.
D. D. Meng, and C.-J. Kim, "Embedded selfcirculation of liquid fuel for a micro direct methanol fuel cell", Proceedings of the 20th IEEE International Conference on Micro Electro Mechanical Systems, Kobe, Japan, 2007, pp. 85-88.
D. D. Meng and C.-J. Kim, "A Micro Direct Methanol Fuel Cell with Self-Pumping of Liquid Fuel," Tech. Dig. Solid State Sensor, Actuator and Microsystems Workshop, Hilton Head Island, South Carolina, Jun. 2006.
D. D. Meng, "Manipulation of Microscopic Gas Bubbles by Using Surface Tension: Capturing, Venting and Pumping," Ph. D. Thesis, University of California, Los Angeles, 2005.
D. D. Meng and C.-J. Kim, "Micropumping by Directional Growth and Hydrophobic Venting of Bubbles," Proc. The 18th IEEE Int. Conf. on Micro Electro Mechanical Systems, Miami, Florida, 2005, pp. 423-426.
D. D. Meng, J. Kim, and C.-J. Kim, "A degassing plate with hydrophobic bubble capture and distributed venting for microfluidic devices," Journal of Micromechanics and Microengineering, 2006, vol. 16, pp. 419-424.
D. D. Meng and C.-J. C. Kim, "Self-Aligned Micro Bubble Arrays by Using Surface Tension," 2004 ASME Int. Mechanical Engineering Congress and Exposition, Anaheim, CA, Nov. 2004, CD: IMECE 2004-62182.
D. D. Meng, T. Cubaud, C.-M. Ho, and C.-J. Kim, "A Membrane Breather for Micro Fuel Cell with High Concentration Methanol," Tech. Dig. Solid State Sensor, Actuator and Microsystems Workshop, Hilton Head Island, South Carolina, 2004, pp. 141-144.
D. C. Papageorgopoulos, et al., "Reprint of A study of RhxSy/C and RuSex/C as methanol-tolerant oxygen reduction catalysts for mixed-reactant fuel cell applications", Elec. Acta. 53 (2007), pp. 1037-1041.
A. P. Papavasiliou, A. P. Pisano, and D. Liepmann, "High-Speed and Bi-Stable Electrolysis-Bubble Actuated Gate Valves," Proc. the 11th (56) References Cited

OTHER PUBLICATIONS

International Conference on Solid State Sensors and Actuators (Transducers '01), Munich, Germany, 2001, pp. 940-943.
E. Sakaue, "Micromachining/Nanotechnology in Direct Methanol Fuel Cell," Proc. IEEE Int. Conf. Micro Electro Mechanical Systems, Miami, FL, 2005, pp. 600-605.
W. Shen, R. T. Edwards, and C.-J. Kim, "Electrostatically-Actuated Metal-Droplet Microswitches Integrated on CMOS Chip", J. Microelectromechanical Systems, 2006 (accepted).
T. Shimizu, T. Momma, M. Mohamedi, T. Osaka, and S. Sarangapani, "Design and fabrication of pumpless small direct methanol fuel cells for portable applications," Journal of Power Sources, 2004, vol. 137, pp. 277-283.
W.-S. Su, S.-T. Lee, M.-S. Tsai, and W. Fang, "3D Lithography and Deposition on Highly Structured Surfaces Using Plasma Surfacemodification, Sam Coating, and Contact Displacement Electroless Plating," Proc. The 19th IEEE Int. Conf. on Micro Electro Mechanical Systems, Istanbul, Turkey, 2006, pp. 274-277.
H. Suzuki and R. Yoneyama, "Integrated microfluidic system with electrochemically actuated on-chip pumps and valves," Sensors and Actuators B, vol. 96, pp. 38-45, 2003.
J.-H. Tsai and L. Lin, "A Thermal-Bubble-Actuated Micronozzle-Diffuser Pump," IEEE/ASME Journal of Microelectromechanical Systems, vol. 11, pp. 665-671, 2002.
F.-G. Tseng, C.-J. Kim, and C.-M. Ho, "A High Resolution High Frequency Monolithic Top-Shooting Microinjector Free of Satellite Drops: Part II: Fabrication, Implementation, and Characterization," Journal of Microelectromechanical Systems, 2002, vol. 11, pp. 437-447.
A. R. Wheeler, H. Moon, C. A. Bird, R. R. O. Loo, C.-J. Kim, J. A. Loo, and R. L. Garrell, "Digital Microfluidics with Inline Sample Purification for Proteomics Analyses with Maldi-Ms," Analytical Chemistry, 2005, vol. 77, pp. 534-540.
D. T. Whipple, R. S. Jayashree, D. Egas, N. Alonso-Vante, and P. J. A. Kenis, "Ruthenium cluster-like chalcogenide as a methanol tolerant cathode catalyst in air-breathing laminar flow fuel cells", Electrochemica Acta, 54 (2009), pp. 4384-4388.
Z. Xiao, G. Yan, C. Feng, P. C. H. Chan, and I.-M. Hsing, "Integrated Fuel Cell Micro Power System by Microfabrication Technique," Tech. Dig. The13th Int. Conf. on Solid-State Sensors, Actuators and Microsystems, Seoul, Korea, Jun. 2005, pp. 1856-1859.
S.-C. Yao, X. Tang, C.-C. Hsieh, Y. Alyousef, M. Vladimer, G. K. Fedder, and C. H. Amon, "Micro-electro-mechanical systems (MEMS)-based micro-scale direct methanol fuel cell development," Energy, 2006, vol. 31, pp. 636-649.
J. Yeom, G. Z. Mozsgai, B. R. Flachsbart, E. R. Choban, A. Asthana, M. A. Shannon, and P. J. A. Kenis, "Microfabrication and characterization of a silicon-based millimeter scale, PEM fuel cell operating with hydrogen, methanol, or formic acid," Sensors and Actuators B: Chemical, 2005, vol. 107, pp. 882-891.
J. Yeom, R. S. Jayashree, C. Rastogi, M. A. Shannon, and P. J. A. Kenis, "Passive direct formic acid microfabricated fuel cells," Journal of Power Sources, 2006 (in press).
Yen, T. J. et al., "A Micro Methanol Fuel Cell Operating at Near Room Temperature," Applied Physics Letters, 2003, vol. 83 (19), pp. 4056-4058.
Jayashree, Ranga S. et al., Air-Breathing Flow-Based Microfluidic Fuel Cell, Jam. Chem. Soc. 2005, 127, 16758-16759.
Shukla, A.K. et al., Advances in Mixed-Reaction Fuel Cells, Fuel Cells 05, 2005, No. 4, 436-447.
MTI Micro Press-Releases, http://www.mtimicrofuelcells.com/news/index.asp, Jul. 11, 2013 (1page).
Patel, Prachi, "Hydrogen Fuel from Formic Acid," http://www.technologyreview.com/news/410135/hydrogen-fuel-from-formic-acid/, May 15, 2005 (6pages).
Fuel Cell Store, Membrane Electrode Assemblies (MEAS), http://www.fuelcellstore.com/en/pc/viewCategories.asp?idCategory=80, Jul. 11, 2013 (5pages).
IBM, Sanyo announce fuel cell prototype, DMFC for notebooks with probably be commercialized in 2007 or 2008, http://www.infoworld.com/harware/ibm-sanyo-announce-fuel-cell-prototype-585, Apr. 11, 2005 (4pages).
Rahim, M.A. Abdel et al., Nickel as a catalyst for the electro-oxidation of methanol in alkaline medium, Journal of Power Sources, 134 (2004) 160-169.
Yeom, J. et al., Passive direct formic acid microfabricated fuel cells, Journal of Power Sources 160 (2006) 1058-1064.
Hur, Janet L et al., Self-Pumping Membraneless Miniature Fuel Cell With an Air-Breathing Cathode, Journal of Microelectromechanical Systems, vol. 21, No. 2, Apr. 2012, 476-483.

* cited by examiner

SELF-PUMPING MEMBRANELESS FUEL CELL

REFERENCE TO RELATED APPLICATIONS

This Application claims the benefit, including priority, of U.S. Provisional Patent Application No. 61/422,989 filed on Dec. 14, 2010. U.S. Provisional Patent Application No. 61/422,989 is incorporated by reference as if set forth fully herein.

STATEMENT REGARDING FEDERALLY SPONSORED RESEARCH AND DEVELOPMENT

This invention was made with Government support under Grant No. 0824269, awarded by the National Science Foundation. The Government has certain rights in the invention.

FIELD OF THE INVENTION

The field of the invention generally relates to fuel cells, which convert chemical energy from a fuel into electricity through a chemical reaction. More particularly, the field of the invention relates to fuel cells utilizing bubbles to pump fuel and/or oxidant in a membraneless fuel cell.

BACKGROUND OF THE INVENTION

A fuel cell is a device that converts chemical energy from a fuel into electricity through chemical reactions, in contrast to combustion of the fuel in an exothermic reaction to produce heat. While many different types of fuel cells have been developed, they all have the same general components and function in the same general manner. A fuel cell consists of three components (other than the fuel and the oxidant), typically layered or sandwiched together: the anode, the cathode and an electrolyte in between. Two chemical reactions occur at the interfaces of the three different components. The net result is that fuel is consumed, water and carbon dioxide are created, and an electric current is produced which can be used to power electrical devices. Fuel cells differ from batteries in that they require a supply of fuel and oxidant to operate, but they can produce electricity so long as fuel and oxidant are supplied.

At the anode, a catalyst oxidizes the fuel, such as hydrogen or a hydrocarbon, thereby producing a positively charged ion and a negatively charged electron. This is commonly referred to as the "oxidation" reaction. For a hydrocarbon fuel, the oxidation also produces carbon dioxide as a waste product. The electrolyte is a substance specifically chosen so ions can pass through it, but the electrons cannot. The freed electrons travel through a power circuit creating the electric current. The ions travel through the electrolyte to the cathode. Upon reaching the cathode, the ions are reunited with the electrons that created the electric current, and the two react with a third chemical, an oxidant such as oxygen, to create water as a waste product. This is commonly referred to as the "reduction" reaction.

In order to effect the oxidation reaction at the anode and the reduction reaction at the cathode, catalysts are used at the anode and the cathode which catalyze the respective reactions.

Accordingly, the most important design features in a fuel cell are:

(1) The electrolyte substance or structure. The electrolyte substance usually defines the type of fuel cell, such as a proton exchange membrane fuel cell (PEMFC). In solid membrane designs, the membrane electrolyte is commonly assembled with an anode and a cathode and used as a membrane electrode assembly, or MEA.

(2) The type of fuel used in the fuel cell. The most common fuel is hydrogen, but hydrocarbons such as natural gas, formic acid and methanol may also be used.

(3) The anode catalyst, which breaks down the fuel into electrons and ions. The anode catalyst is often made up of platinum.

(4) The cathode catalyst, which turns the ions into the waste products, such as water, in the reduction reaction with an oxidant and the freed electrons. The cathode catalyst is often made up of platinum or nickel.

A typical fuel cell produces a voltage from 0.6 V to 0.7 V at full rated load. To deliver more energy than a single fuel cell, the fuel cells are combined in series and parallel circuits, where series yields higher voltage, and parallel allows a higher current to be supplied. Such a design is called a fuel cell stack. In addition, the cell surface area of a fuel cell can be increased to provide more current from each cell.

As referred to above, the hydrogen-oxygen PEMFC is the prime example of a fuel cell design. As in its name, the fuel is hydrogen and the oxidant is oxygen. The PEMFC utilizes a solid polymer electrolyte membrane (PEM) between the anode and the cathode. The PEM allows only positively charged ions to pass through it to the cathode, while negatively charged electrons are blocked and must travel along an external power circuit.

On the anode side, hydrogen fuel is supplied and diffuses to the anode catalyst which oxidizes the hydrogen into protons and freed electrons. The protons pass through the PEM to the cathode, while the electrons are forced to travel along an external power circuit because the PEM is electrically insulating.

At the cathode, the electrons (after passing through the power circuit) and positively charged ions react with the oxygen molecules of the supplied oxidant to form water as the waste product.

The fuels used in fuel cells have relatively high energy density compared to other power sources. For example methanol has an energy density of 4900 Wh/L and formic acid has an energy density of 2104 Wh/L. Due to the very high energy density of their fuels, fuel cells are a very attractive power source for both macro and micro systems. In particular, miniature fuel cells have broad applications in portable devices such as laptop computers, cellular phones and global positioning systems (GPS).

However, fuel cells face a few important challenges in order to contend as viable candidates for micro power sources. Some of these challenges include "packaging penalty" (explained below), fuel crossover, fuel delivery, water management, and waste product removal.

One of the main challenges in miniaturizing fuel cells below a centimeter has been the need of ancillary components such as a fuel pump (to maintain the required flow of fuel) and a gas separator to build a complete fuel cell system. Because these parts are not easily scaled down, they take up increasingly more volume relative to the fuel in a miniaturized system—a critical issue known as the "packaging penalty" referred to above.

To address some of these issues, U.S. Pat. No. 7,976,286 describes a self-circulating fuel cell, which eliminates several of the ancillary parts, such as the liquid pump for fuel delivery and the phase separator for $CO_2$ bubble removal. The contents of this patent is expressly incorporated by reference herein in its entirety. The device described in this patent utilizes an embedded bubble pumping mechanism, which uses directional bubble growth and a selective gas venting, to flow fuel within an anodic microchannel. An electrode-PEM-electrode sandwich, or membrane electrode assembly (MEA), separates the anodic microchannel containing a fuel from a cathodic microchannel containing an oxidant. The $CO_2$ bubbles generated by the oxidation of fuel within the anodic microchannel are used to pump fuel through the anodic microchannel. The $CO_2$ bubbles are then removed from the anodic microchannel through a non-wetting venting membrane, thereby obviating the need for a gas separator because the gas bubbles simply diffuse through the venting membrane to the outside environment. Thus, without using any discrete pump component or gas separator, the fuel is actively circulated through the anodic microchannel and the $CO_2$ waste is removed, thereby maintaining the fuel concentration. In contrast, passive fuel cells rely only on fuel diffusion to the anode, with the inevitable tendency to develop a depletion zone over time.

Although the self-pumping mechanism of U.S. Pat. No. 7,976,286 greatly simplified the anode side of the fuel cell, the oxygen source for the cathode side remains a bulky attachment in the form of a pressurized oxygen tank, a fan or microchannels filled with actively-pumped, oxygen-saturated electrolyte solution. Furthermore, the two chamber configuration, separated by an MEA, is closely associated with many problems of fuel cell systems, including fuel crossover, cathode flooding, anode dry out, and difficulty in miniaturization.

Accordingly, there is a need for an improved fuel cell design which overcomes some of the problems of previous fuel cells, and preferably is capable of miniaturization below centimeters, and/or for use in micro-electromechanical system (MEMS) applications.

SUMMARY OF THE INVENTION

The present invention is directed to a device, and method of operation, for a fuel cell which uses bubble-based pumping to self-pump the fuel to the anode, and a single, common channel separating the anode from the cathode through which fuel and electrolyte flow. The invention provides a design and method of operation for fuel cells that does not use a PEM and actively supplies the fuel without a discrete pump. One stream of fuel and electrolyte self-pumps using the byproduct bubbles in the single channel containing both the anode and the cathode.

In one embodiment, the fuel cell comprises a channel having a first side and a second side, an inlet for coupling to a source of fuel, an outlet downstream of the inlet, and a bubble generating region between the inlet and the outlet. The channel can have any suitable flow path, and any suitable shape or size. The first side of the channel comprises an anode of the fuel cell. The anode may include a suitable first catalyst for oxidizing a fuel within the channel, such as platinum and palladium. The second side of the channel is electrically insulated from the first side of the channel and comprises a cathode of the fuel cell. The cathode includes a suitable second catalyst reducing oxidant within the channel, such as platinum and palladium.

A one-way valve, which is in communication with the channel, is located upstream of the bubble generating region. The one-way valve may be any suitable structure that provides higher flow resistance in the upstream direction and lower flow resistance in the downstream direction. For example, the one-way valve may be a partial obstruction disposed within the channel or a plurality of wetting capillaries, which allow fuel to flow through the one-way valve in the downstream direction and block bubbles from advancing or expanding in the upstream direction.

A vent, also in communication with the channel, is disposed over a portion of the channel downstream of the bubble generating region. The vent allows bubbles formed in the bubble generating region to vent out of the channel, but preferably prevents liquid (such as fuel and electrolytes) from escaping through the vent. For example, the vent may be a non-wetting (e.g. hydrophobic) porous membrane, with pores sized appropriately so that the liquid-gas menisci at the pores block liquids from flowing through the pores, but allow the gas bubbles to pass through relatively freely.

In another embodiment of the invention, the method of operation of the fuel cell is as follows. The inlet of the channel is coupled to a fuel source, such as methanol, formic acid, or other suitable hydrocarbon fuels. When an electrical load is applied to the fuel cell, the fuel is oxidized at the anode thereby generating bubbles (e.g. $CO_2$) within the bubble generating region of the channel. The bubbles generate a pumping force on the fuel as the bubbles accumulate and grow in the downstream direction toward the vent, and then shrink as the bubbles vent out of the channel. The shrinking bubble pulls fresh fuel from the fuel source through the one-way valve into the channel where it is oxidized at the anode thereby starting the next pumping cycle. Meanwhile, at the cathode, an oxidant is reduced within the channel to produce waste product such as water.

In another aspect of the present invention, the cathode may comprise a gas diffusion electrode, such as an air-breathing cathode. This type of electrode supplies oxygen as the oxidant to the cathode from ambient air, eliminating the need for a bulky pressurized oxygen tank, a fan to blow air, or a pump to flow an oxygen-rich solution to supply the oxidant to the cathode.

In still another aspect of the present invention, the inlet may be coupled to a source of fuel and electrolyte mixture, as opposed to separate flows of fuel and electrolyte (such as used in a multi-stream laminar flow-based fuel cells (LFFCs)). Furthermore, the mixed fuel and electrolyte may be used even with a platinum-based catalyst as the second catalyst of the cathode, without unduly compromising performance caused by mixed potential at the cathode. Typically, a mixture of fuel and electrolyte causes a mixed potential at each electrode resulting from both oxidation of fuel and reduction of oxidant occurring simultaneously at the electrodes.

Accordingly, the present invention may provide a design for a membraneless (i.e. no MEA) active (i.e. the fuel is pumped) fuel cell with no moving parts. The simple solid-state construction not only enables miniature fuel cells, but also makes the design and manufacturing scalable. The scalability allows one to build regular-scale systems by stacking the miniature fuel cells.

Further features and advantages will become apparent upon review of the following drawings and description of the preferred embodiments.

DETAILED DESCRIPTION OF THE PREFERRED EMBODIMENTS

Figure 1:
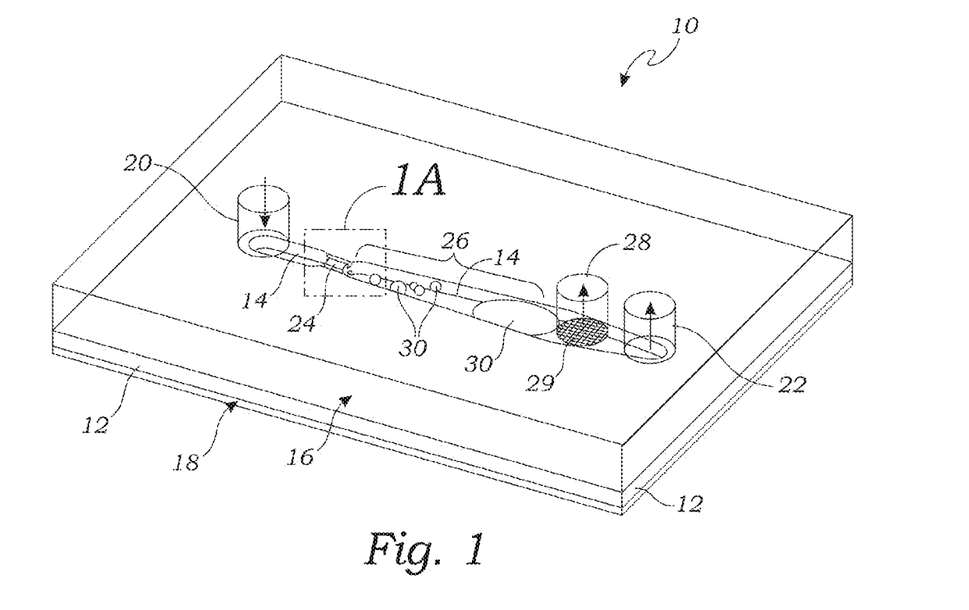
FIG. 1 is a perspective view of a schematic illustration of a fuel cell according to one embodiment of the present invention.

Referring to FIG. 1, a fuel cell 10 according to one embodiment of the present invention is shown. The fuel cell 10 comprises a main substrate 12 in which a channel 14 is formed. The substrate 12 may be formed from any suitable material, preferably a material in which a channel and/or other features can be easily formed such as be machining, etching, or other fabrication techniques. For example, the substrate material may be polydimethylsiloxane (PDMS), silicon, or poly(methyl methacrylate) (PMMA).

The channel 14 in the substrate 12 may be formed to be open on a first side (top side as shown in FIG. 1) and a second side (bottom side as shown in FIG. 1), along at least a portion of the channel to allow access to the channel by an anode 16 and a cathode 18 to form the first side and second side of the channel, respectively. The orientation of the fuel cell 10 and its components is not limited to that shown in FIG. 1, and it should be understood that terms "top" and "bottom" and other relative terms are only used for reference, and are not limiting of the invention as described herein. The channel 14 is also connected to an inlet 20 at its upstream end and an outlet 22 at its downstream end. The terms "downstream" and "upstream" are with respect to the flow direction which is from left-to-right in FIG. 1. The inlet 20 is coupled to a source of fuel, such as a fuel reservoir (not shown). The channel 14 may be diverging in the downstream direction as shown in FIG. 1, which can assist in the downstream movement of the bubbles 30. However, it is not required because the downstream movement of the bubbles 30 within the channel 14 is driven mostly by the growth of each bubble, by newly generated bubbles on the upstream side, and by the venting of bubbles through a vent 28.

As shown in the embodiment of FIG. 1, the anode 16 is a flat plate which is bonded to the first side of the substrate 12 thereby forming the first side of the channel 14. In other words, the anode 16 forms the top side of the channel 14, as shown in orientation of FIG. 1. The anode 16 may be bonded to the substrate 12 by any suitable method, such as adhesives like glue or epoxy, ultrasonic bonding, etc. The anode may be formed of any suitable conductive material, such as graphite or other material. A suitable anode (or first) catalyst 17 (see FIG. 2) for catalyzing the oxidation of the fuel at the anode 16 is also disposed on the anode in communication with the channel 14. For example, the anode catalyst 17 may be platinum, palladium, etc.

Similarly, the cathode 18 is a flat plate which is bonded to the second side of the substrate 12 thereby forming the second side of the channel 14; i.e. the cathode 18 forms the bottom side of the channel 14, as shown in the orientation of FIG. 1. The cathode 18 may be bonded to the substrate 14 by any suitable method, such as adhesives like glue or epoxy, ultrasonic bonding, etc. The cathode may be formed of any suitable material, such as graphite, carbon cloth or other material. A suitable cathode (or second) catalyst 19 (see FIG. 2) for catalyzing the reduction reaction of an oxidant at the cathode 18 is also disposed on the cathode in communication with the channel 14. For instance, the cathode catalyst 19 may be platinum, palladium, nickel, etc.

As described above, the fuel cell 10 preferably utilizes a single stream of fuel and electrolyte mixture. However, it has been commonly accepted that when flowing a mixed stream, the anode and cathode catalysts should selectively oxidize the fuel and reduce the oxidant, respectively. However, platinum is known to be of the preferred catalysts for both fuel oxidation and oxygen reduction, such that it is NOT selective as to oxidation of fuel and reduction of oxidant. Therefore, platinum has not been considered as a preferable catalyst for the cathode of mixed-reactant fuel cells due to severe mixed potential from both oxidation of fuel and reduction of oxidant occurring simultaneously at the cathode. However, as discussed in more detail below, it was discovered that platinum could be used effectively for the cathode catalyst in the fuel cell design of the present invention. While platinum may be used as the catalyst on the cathode, palladium is preferably used as the catalyst on the anode as it provides initial fuel selectivity in the mixed fuel-electrolyte system.

Figure 1A:
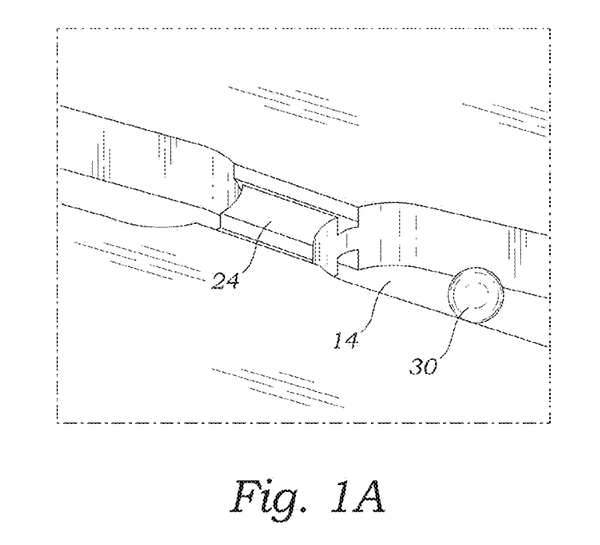
FIG. 1A is an enlarged view of the one-way valve on the fuel cell of FIG. 1, according to one embodiment of the present invention.

Still referring to FIG. 1, a one-way valve 24 is located within the channel 14 upstream of a bubble generating region 26 within the channel 14. Accordingly, the bubble generating region 26 is the portion of the channel 14 where the anode catalyst 17 of the anode 16 is located, between the one-way valve 24 and a vent 28. As better shown in the enlarged view window of FIG. 1A, the one-way valve 24 may comprise a partial obstruction such as a plurality of capillaries or narrower conduits disposed within the channel 14. Alternatively, the one-way valve 24 may simply be formed by reducing the cross-sectional area of the channel 14 at the location of the valve 24.

A vent 28 is provided over a portion of the channel 14 downstream of the bubble generating region 26. The vent 28 removes the bubbles 30 formed in the bubble generating region to be removed from the fluid flow within the channel 14. The vent 28 may include a non-wetting (e.g. hydrophobic) porous membrane 29. For instance, the porous membrane 29 may be formed using a porous PTFE membrane (e.g. PTFE membrane with 3 μm pore diameter available from MILLIPORE, Inc.), a porous polypropylene membrane (e.g. porous polypropylene membrane with 0.2 μm pore diameter available from CHEMPLEX INDUSTRIES, or PTFE tape commonly referred to as "Teflon Tape."

The outlet 22 may be coupled to a waste container in an "open" system or it may recirculate to the fuel reservoir in a recirculating system.

Figure 2:
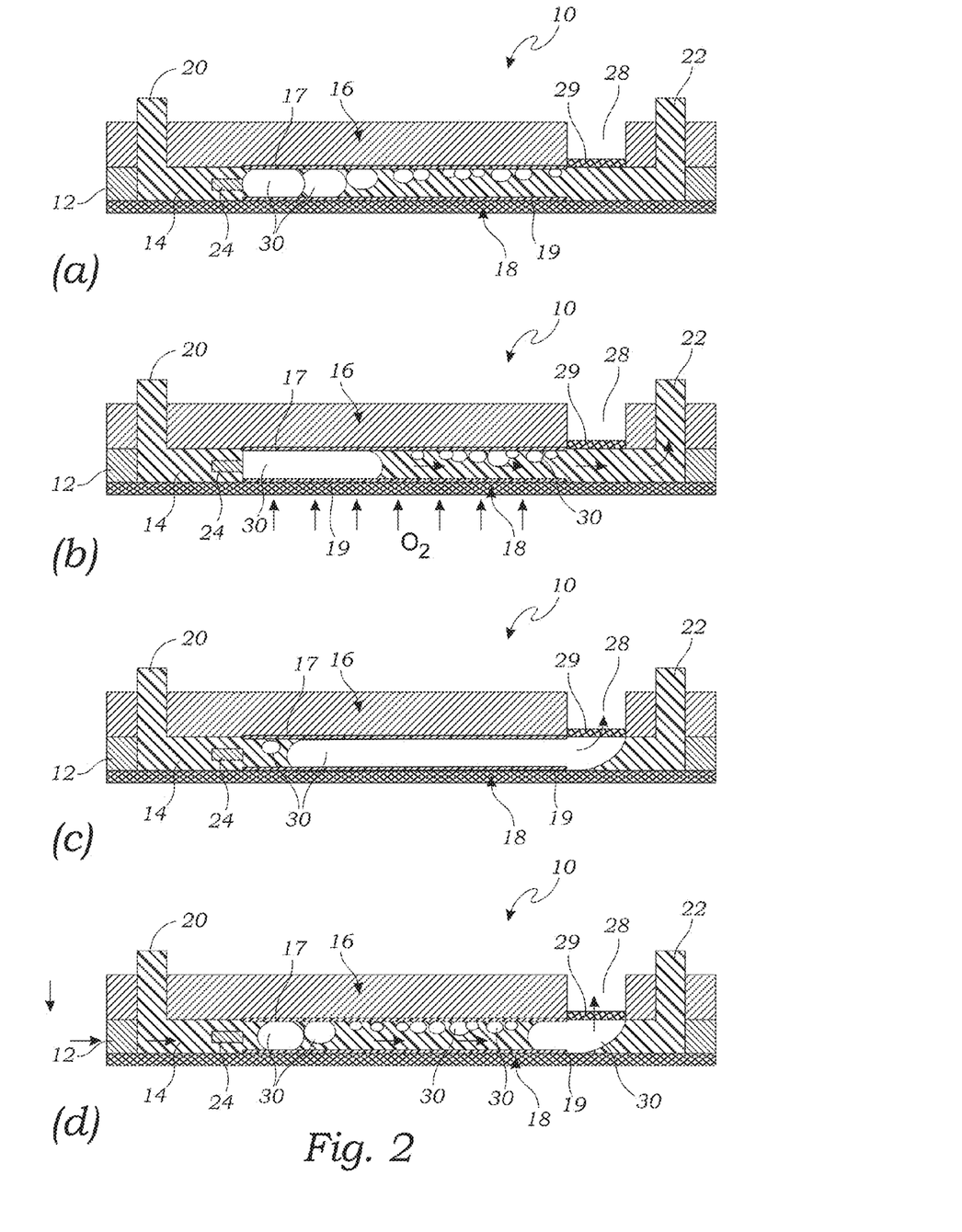
FIG. 2 is a series of schematic cross-sectional views of the fuel cell of FIG. 1 showing the operation of the fuel cell including the formation and movement of bubbles within the fuel cell, according to one embodiment of the present invention.

In another aspect, the cathode 18 may comprise an air-breathing cathode (see FIG. 2(b)) which allows oxygen from the ambient air to diffuse to the cathode as an oxidant, rather than relying on oxygen dissolved in a fuel-electrolyte mixture as is typical in conventional mixed-reactant fuel cells. The air-breathing cathode may be formed from a gas diffusion material, such as a carbon cloth, or the like.

Accordingly, a fuel cell 10 is provided which does not utilize an MEA (i.e. membraneless) or ancillary components such as a discrete fuel pump and gas separator, and which can be implemented in solid-state form with no moving parts.

Turning now to FIG. 2, the operation of the fuel cell 10 will be described. First, the channel 14 is filled with a fuel and electrolyte mixture by coupling the inlet 20 to a fuel reservoir. When the two fuel cell electrodes, the anode 16 and the cathode 18, are connected through an electrical load, the electrocatalytic reaction starts. The fuel is oxidized on the anode catalyst 17 of the anode 16, producing positively charged ions, free electrons and $CO_2$ as a byproduct. The $CO_2$ creates bubbles within the bubble generating region 26. As the $CO_2$ nucleates on the anode 16 and more $CO_2$ is produced, the bubbles start to grow, as shown in FIG. 1(a). The bubbles merge into a large bubble, which grows downstream because the one-way valve 24 blocks upstream growth, thereby pushing the liquid in the channel toward the vent 28, as shown in FIG. 2(b). As the bubble moves downstream, it merges with and clears most of the bubbles in the channel 14, as shown in FIGS. 2(b) and 2(c). Also as shown in FIG. 2(c), the bubble grows and moves downstream until it reaches the venting membrane 29 of the vent 28. The bubble is removed rapidly from the channel 14 through the venting membrane 29 as shown in FIG. 2(d). While the bubble shrinks by venting, fresh fuel is pulled into the channel through the one-way valve 24 from the inlet 20, starting a new cycle of reaction and pumping, as also shown in FIG. 2(d). Because the bubble starts to appear first near the one-way valve, the size of the bubble may be larger on the downstream side within the channel 14 within a pumping cycle. Thus, the bubble adjacent the one-way valve tends to be large, thereby also minimizing backflow and maintaining the efficiency of the self-pumping mechanism. Meanwhile, the free electrons travel through the electrical load circuit from the anode to the cathode, and the ions diffuse to the cathode. Also, the air-breathing cathode provides oxygen (oxidant) from the ambient air to the cathode. The ions, electrons and oxygen react in a reduction reaction at the cathode catalyst 19 of the cathode 18 within the channel 14 to produce a waste product water.

Figure 3:
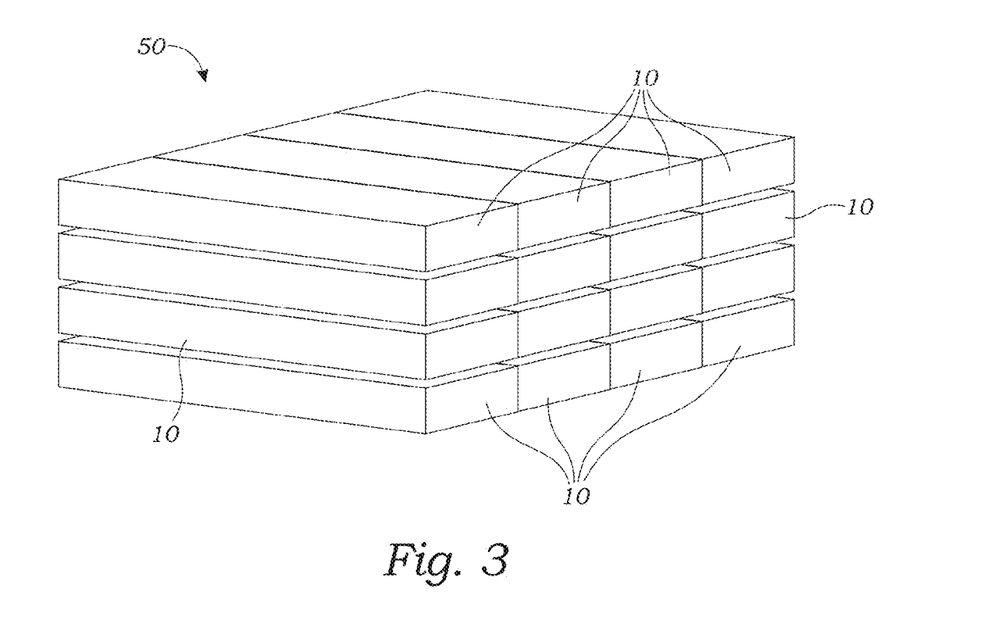
FIG. 3 is a perspective view of a schematic illustration of a fuel cell system comprising a plurality of fuel cells combined together.

Referring now to FIG. 3, in another embodiment of the present invention, a fuel cell system 50 comprises an array of the fuel cells 10 described above may be combined together to produce more energy than a single fuel cell 10. The fuel cells 10 may be combined in series or in parallel, or a combination of series and parallel to yield higher voltage (fuel cells connected in series) and/or higher current to be supplied (fuel cells connected in parallel). The fuel cells may be configured such that the inlet 20 of each fuel cell is coupled to the same fuel reservoir, or a plurality of fuel reservoirs. Furthermore, a plurality of the fuel cells 10 can be fabricated on single piece of substrate 12 in parallel, series or a combination of both. Even further, a plurality of the fuel cells 10 can be stacked in a 2-D or 3-D array to form a fuel cell system 50, as shown in FIG. 3.

A test fuel cell was developed and fabricated substantially according to the design shown in FIGS. 1 and 2. The main substrate 12 was formed from a 1.6 mm thick, clear PMMA sheet cut into a rectangle having a length of 75 mm and a width of 20 mm. The channel 14 was cut into the PMMA sheet using a Prolight® CNC milling machine. The channel 14 had standard width of 3.2 mm which converged around the one-way valve 24, and diverged from proximate the one-way valve 24 in the downstream direction to a maximum width of about 6 mm. The channel 14 was cut the full thickness of the substrate 12, and therefore the channel 14 had a depth of 1.6 mm. The one-way valve 24 was also machined from the PMMA sheet by forming 4 smaller conduits between the inlet 20 and the bubble generating region 26. The sidewalls of the channel 14 were made transparent by polishing the surface with grade 1500 sandpaper and a polishing compound (Turtle Wax®) to allow visual observation of the bubble pumping process during experiments.

The anode 16 was formed from a 5 mm thick graphite plate also cut into a 75 mm×20 mm rectangle. Three holes, 5 mm in diameter, were drilled in the plate to form the inlet 20, the outlet 22 and the vent 28. After machining, the anode plate was rinsed with methanol and sonicated in a water bath to remove debris and particles generated during the machining. A palladium catalyst ink was dropped and dried to cover the reaction area, loading 2 mg/cm$^2$ of palladium black on the graphite plate, thereby forming the anode catalyst 17.

The cathode 18 was formed from carbon cloth with 0.5 mg/cm$^2$ using 30% by weight platinum on Vulcan XC-72. A platinum catalyst ink was dropped and dried, loading 2 mg/cm$^2$ of additional platinum black on the reaction area of the cathode, thereby forming the cathode catalyst 19. The prepared carbon cloth functioned as an air-breathing cathode to obtain a high oxygen supply from the ambient air rather than relying on oxygen dissolved in the fuel-oxidant mixture as in conventional mixed-reactant fuel cells.

The catalyst ink was prepared by measuring out a proper amount of palladium black or platinum black particles, as the case may be, and adding 10% by weight Nafion® solution (from Dupont, Inc.) for proton conduction and particle binding. For each case, deionized water was added to make the total volume 500 μL. Then, a droplet volume was metered to deposit 2 mg of palladium and 1 mg of Nafion per square centimeter for the anode catalyst ink or 2 mg of platinum and 0.1 mg of Nafion per square centimeter for the cathode catalyst ink. After dropping and spreading the catalyst ink on the respective electrode, the solvent was evaporated under room temperature. The loading of palladium or platinum black was determined to be 2 mg/cm$^2$ to prevent the catalyst layer from building internal stress and peeling off from the electrode.

After being prepared, the anode plate 16 was glued to the top side of the substrate plate 12 using rubber cement, such that the anode plate 16 formed the first side of the channel 14. Similarly, the cathode plate 18 was attached to the bottom side of the substrate plate 12 using epoxy, such that the cathode plate 18 formed the second side of the channel 14. The substrate 14 walls form the other two sides of the channel 14. Rubber cement was used because it allowed the anode to be disassembled for modifications, while epoxy provided a strong, leak proof bond for the flexible cathode 18.

The vent 28 was formed from a small tube wrapped with PTFE tape to seal around the vent hole in the anode plate 28. The porous membrane 29 was formed from the PTFE tape as well, as it was determined that the PTFE tape has a similar pore diameter as the PTFE membrane from Millipore. When used in the test fuel cell, the PTFE tape properly vented the $CO_2$ bubbles without liquid leakage. Through the testing performed on the test fuel cell, there has been no noticeable degradation of the assembled test device.

This membraneless, self-pumping test fuel cell described above was tested under various conditions and data was obtained to characterize the performance of the test fuel cell. The power characteristics (current and voltage) were measured using a potentiostat/galvanostat Model 263A (Princeton Applied Research). The data presented in the figures is normalized with respect to the cathodic catalyst-exposed area of 1.0 cm$^2$, while the area of anode catalyst is smaller (0.78 cm$^2$) due to the venting hole, which maintains a conservative view. The fuel cell device was clamped and held in the air for sufficient oxygen supply under room temperature and ambient pressure. The fuel solution was filled into the inlet through inlet tubing, and the waste flowed out of the outlet into outlet tubing. Reservoirs with a large area were connected to the inlet and the outlet through tubing and placed on the same level to avoid hydraulic pressure build up or gravity driven fuel delivery during regular fuel cell testing. Still, to confirm fuel delivery, reservoirs with a small area were placed above the inlet and outlet. The fuel delivery is easily monitored simply by reading the levels in the reservoirs. The mixed fuel and electrolyte solution was prepared by mixing various concentrations (0.5M, 1M, 5M, 10M) of formic acid (HCOOH, Sigma-Aldrich) as the fuel, with 1M sulfuric acid ($H_2SO_4$, EMD) in deionized water as the electrolyte. Here, formic acid was used as the fuel, since more $CO_2$ bubbles are produced for a given current output, compared with direct methanol fuel cell, as shown below in the chemical equations Direct formic acid fuel cell:

Anode: $HCOOH \rightarrow CO_2 + 2H^+ + 2e^-$

Cathode: $\frac{1}{2}O_2 + 2H^+ + 2e^- \rightarrow H_2O$

Direct methanol fuel cell:

Anode: $CH_3OH + H_2O \rightarrow CO_2 + 6H^+ 6e^-$

Cathode: $3/2 O_2 + 6H^+ + 6e^- \rightarrow 3H_2O$

Diluted sulfuric acid is used as an electrolyte for proton conduction through the liquid inside the channel. At the same time, it serves as the medium for oxygen to diffuse from ambient air into the vicinity of the cathode. Bubble pumping was recorded with a digital video camera from the side of the device through the transparent channel plate.

Figure 4:
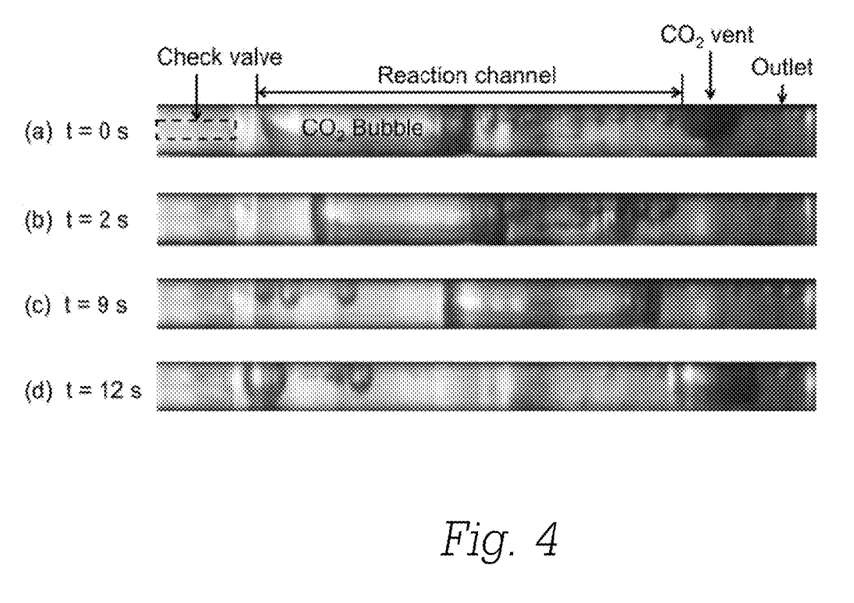
FIG. 4 is a series of photographs illustrating the formation and transport of bubbles within a test apparatus similar to that illustrated in FIG. 1, and described below.

Initially, the bubble pumping mechanism was tested. Different from the normal fuel-cell testing conditions, a setup with individual reservoirs above the inlet and outlet was used for an easy visual confirmation of fuel delivery. A successful bubble pumping would deliver the fuel from the inlet to the outlet and make the level of the fuel reservoir fall and that of the waste reservoir rise. The pumping action inside the channel was visually observed from the side through the transparent channel plate 12. FIG. 4 is a series of photographs taken from the video recordings which confirms that the $CO_2$ bubbles grow directionally downstream (to the right) toward the vent 28 (see FIGS. 4a and 4b). As the large bubble leaves the channel 14 through the venting membrane 29 and a fresh fuel enters the reaction channel 14 from the left, new small bubbles start to nucleate near the entrance (see FIGS. 4c and 4d), starting a new pumping cycle. At the same time, it was observed that the liquid level of the waste reservoir above the outlet rose and the level of the fuel reservoir above the inlet fell, when bubbles reached the venting membrane 29 and passed out of the channel 14.

On the other hand, the level in the fuel reservoir maintained the same level as the bubble was growing, confirming that the $CO_2$ bubbles generated by the fuel-cell electrochemistry indeed pumps the fuel mixture across the channel 14. However, the setup in this experiment, designed particularly to prove the concept with a focus on visual confirmation of the self-pumping mechanism, is not capable of operating as a fuel cell for long, because the hydraulic backpressure (from the rising level of the waste reservoir) eventually grows too high to pump against. Although the fuel is delivered by surface tension and is in essence not sensitive to gravitational orientation, the device in this experimental setup is affected by the hydraulic pressure; note the fuel column falls and the waste column rises as the fuel is consumed. These columns are made open to air and placed vertically in this experiment to confirm the proposed device can pump against a backpressure. In actual practice, a complete fuel-cell system will be designed so that the fuel cartridge is slightly pressurized or balanced with the waste side.

In order to theoretically assess the capability of the bubble pumping to supply enough fuel for the reaction, the rate at which the microchannel can be refreshed was estimated at a certain electrical current output. To simplify the analysis, it is assumed that the large $CO_2$ bubble fills up the entire reaction channel (between the check valve and the gas vent). The number of $CO_2$ molecules needed to fill up the channel is estimated using the ideal gas law under standard conditions for temperature and pressure (STP);

$$PV = nRT$$

where P is the absolute pressure of the gas, V is the volume of the gas, n is number of moles, R is the universal gas constant, and T is the absolute temperature. Since two electrons need to flow from anode to cathode to produce one molecule of $CO_2$, it is calculated that the test device (the geometries given above) needs to produce ~20 mA/cm$^2$ of current density in order to refresh the channel every 1 minute. The timescale in this calculation was selected, following the repeatedly observed pumping frequency during the experiments. Qualitatively speaking, the production of a higher current will generate $CO_2$ bubbles faster, resulting in more frequent channel refreshments and a faster flow rate of the fuel. Depending on the current density, which can be controlled through the external electric load connecting the fuel cell electrodes, the measured time for one pumping cycle varied from a few tens of seconds to minutes.

Figure 5:
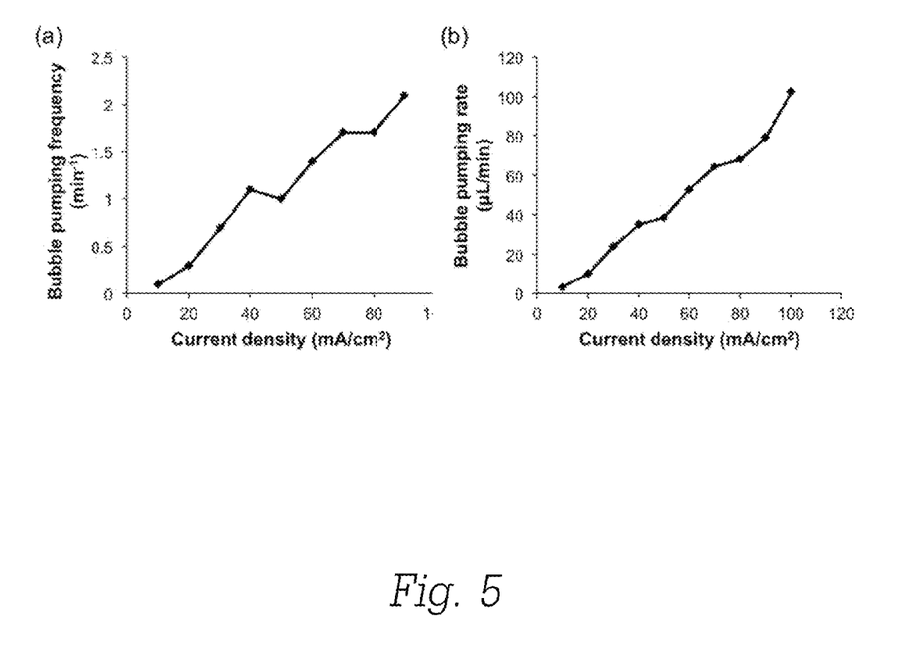
FIG. 5(a) is a graph of bubble pumping frequency vs. current density using a test apparatus similar to that illustrated in FIG. 1, and described below.
FIG. 5(b) is a graph of bubble pumping volumetric rate vs. current density using a test apparatus similar to that illustrated in FIG. 1, and described below.

As shown in FIG. 5(a), the frequency of bubble pumping increases substantially linearly with the current density. The experimental result of bubble pumping is approximately half of the ideal calculated case (e.g., ~40 mA/cm$^2$ required for bubble pumping frequency of 1/min). The discrepancy comes from the small bubbles near the venting area, which escape directly through the hydrophobic membrane without contributing to the pumping action and the occasional leakage through the air-breathing cathode rather than the venting membrane.

The volumetric pumping rate was also quantified by monitoring the volume of the bubbles leaving the channel, as shown in FIG. 5(b). Since the volume of bubbles is not consistent throughout the cycles and because the diverging channel also assists in refreshing the fuel, the bubble pumping frequency does not give an accurate pumping rate by itself. The results of FIG. 5(b) show a linear trend as $CO_2$ production and pumping are proportional to the amount of current generated. Although the observed frequency of bubbles leaving at 50 mA/cm$^2$ is lower than that at 40 mA/cm$^2$ in FIG. 5(a), the measured pumping rate at 50 mA/cm$^2$ is higher than that at 40 mA/cm$^2$ in FIG. 5(b). The bubble pumping frequency is somewhat less reliable because the volumes of bubbles involved in pumping are not consistent.

Figure 6:
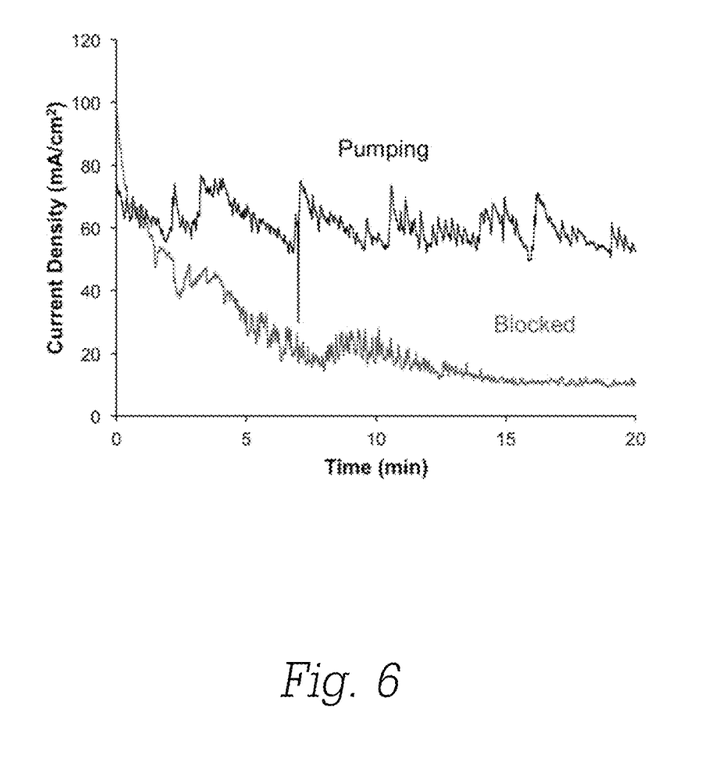
FIG. 6 is a graph comparing current density vs. time during bubble pumping and with bubble pumping disabled by blocking the vent using a test apparatus similar to that illustrated in FIG. 1, and described below.

In the next set of experiments, the inlet and outlet shared the same reservoir, eliminating the hydraulic pressure and recirculating the fuel. A longer testing is presented in FIG. 6 which shows a graph comparing current density vs. time during bubble pumping and with bubble pumping disabled by blocking the vent. The device continued to refresh the channel with new streams of fuel and kept running. In contrast, once the vent 28 was blocked for comparison, the current density quickly decreased. However, the fuel cell with the blocked vent maintained higher current densities and decreased slowly compared to expectations. The discrepancy can be explained by noting that some bubbles leak through the air-breathing cathode in the test fuel cell. The lost volume of bubbles is filled by the fuel from inlet or outlet, replenishing a small amount of additional fuel to the channel. However, this supply does not have a directional pumping effect. Therefore, over time, the current eventually dies out until there is no significant bubble growth.

The condition of the air-breathing cathode was also monitored during the experiments. The cathode allowed excessive water formed within the cathode layer to evaporate but keeps the bulk liquid inside the channel of the cell. Even though the test fuel cell was left for several hours to stabilize the open circuit potential (OCP), i.e. no current density but evaporation through the cathode, both electrodes, including air-breathing cathode did not show any signs of drying out. Small water droplets were observed to condense on the bench surface near the cathode, indicating some evaporation, when running under higher current densities (~50 mA/cm$^2$). However, no liquid leakage was detected, confirming that the cathode keeps the liquid inside the channel of the fuel cell. At high pressures (tens of kPa), it is known that the fuel can leak through the cathode. However, the proposed cell is not pressurized by any auxiliary components such as liquid pump, and brings the fuel into the reaction channel only by the bubble pumping action and surface tension. The Laplace pressure built up by the bubble menisci is on the order of hundreds of Pa, which is safely lower (by two orders of magnitude) than the leakage pressure.

In a conventional fuel-cell configuration, platinum is considered as a desirable option for both anode and cathode. However, the mixed potential issue makes it an undesirable choice to simultaneously employ platinum as the catalyst for both the anode and cathode in a mixed-reactant fuel cell. Particularly, the mixed potential issue is severe at the cathode, since platinum is prone to oxidize fuel while the cathode is supposed to reduce the oxidant, typically oxygen. As a result, a non-noble metal is commonly used as the cathode catalyst. Contrary to this common practice, as mentioned above, the fuel cell design has the advantageous characteristic that platinum can be used as a cathode catalyst. Focusing on the air-breathing cathode, $O_2$ is directly supplied through the air-breathing cathode from ambient air to the electrolyte/catalyst interface where both the fuel (HCOOH) and supporting electrolyte ($H_2SO_4$) are present. Considering the equilibrium constant of HCOOH (Ka=1.8× $10^{-4}$) and $H_2SO_4$ in water (K=2.4×$10^6$), the number of HCOOH molecules desiring to break and oxidize on the cathode is far less than the number of H$^+$ ions dissociated from $H_2SO_4$ ready to join with $O_2$ from ambient air by 10 orders of magnitude. This may explain why the cathode of the fuel cell of the present invention seems to have fuel tolerance.

Figure 7:
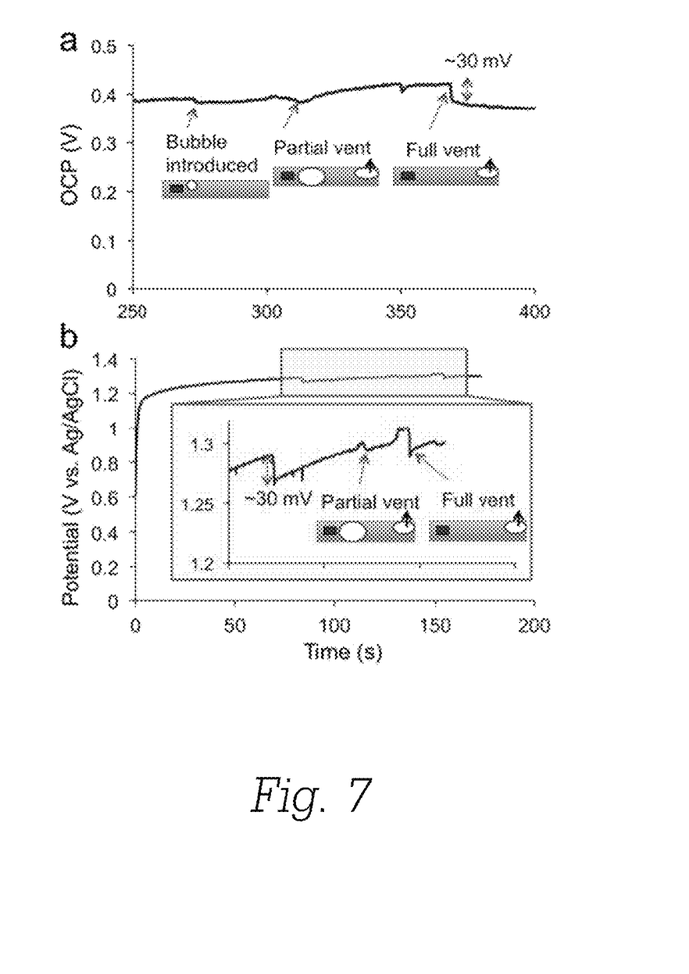
FIG. 7(a) is a graph of open circuit potential (OCP) vs. time to show the effect of bubble pumping, moving and venting on the cathode electrode using a test apparatus similar to that illustrated in FIG. 1, and described below.
FIG. 7(b) is a graph of potential of the cathode against a reference electrode under a constant current of 30 mA/cm$^2$ using a test apparatus similar to that illustrated in FIG. 1, and described below.

The effect of the bubble pumping on the catalytic activities on both electrodes was also tested by measuring the open circuit potential (OCP) under varying conditions. The graphs of FIG. 7 show OCP during different bubble conditions. The graphs of FIG. 7 indicate that the bubble growing, moving and venting do not significantly disturb the potential between the two electrodes. First, in FIG. 7(a), the total disturbance in the fuel cell was monitored by investigating the OCP fluctuation while injecting bubbles into the bubble generating region manually using a syringe. The greatest disturbance of ~30 mV occurs when the bubble was removed to induce a rapid flow of fresh fuel mixture into the channel. On the other hand, a constant current of 30 mA/cm$^2$ was supplied to the cell while monitoring the cathode potential (vs. Ag/AgCl), and the bubble grew similarly to the fuel-cell reaction. Similar fluctuation behavior of ~30 mV at most is seen in FIG. 7(b) which shows the OCP of the cathode against a reference electrode. This indicates that the bubble action is disturbing mostly the cathode, which still only producing a negligible effect. It is also noted that, when the bubble grew to take up the space inside the channel, the potential gradually rose, likely because the bubble provided a clear separation between the anode and the cathode.

Figure 8:
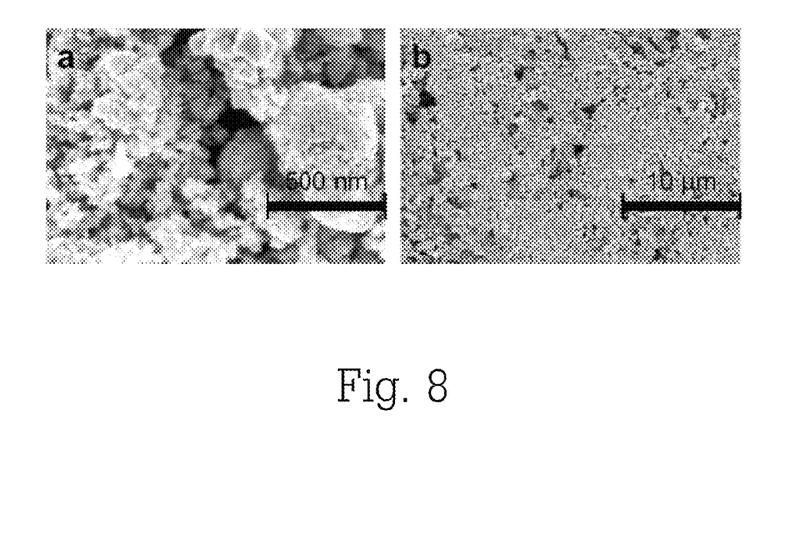
FIGS. 8(a) and 8(b) are scanning electron photographs of the solution deposited palladium catalyst on the electrodes of the test apparatus similar to that illustrated in FIG. 1, and described below.

The surfaces of the deposited catalysts on the electrodes were investigated under scanning electron microscopy (SEM). High surface area is desirable for higher electrocatalytic reaction kinetics on each electrode. Although the highly magnified view shown in FIG. 8(a) shows a hierarchical structure in nanometer scale, the palladium black has a fairly even and flat surface with little porosity at the micrometer scale shown in FIG. 8(b), which is not desirable because it results in less reaction surface area. Compared with electroplated versions, the solution-deposited catalyst black used in the test fuel cell produced less roughness in micrometer scale, which may not be sufficient to catalyze fuel-cell reactions. Therefore, electroplated catalyst black surface is probably preferable to solution-deposited catalyst black surface.

Figure 9:
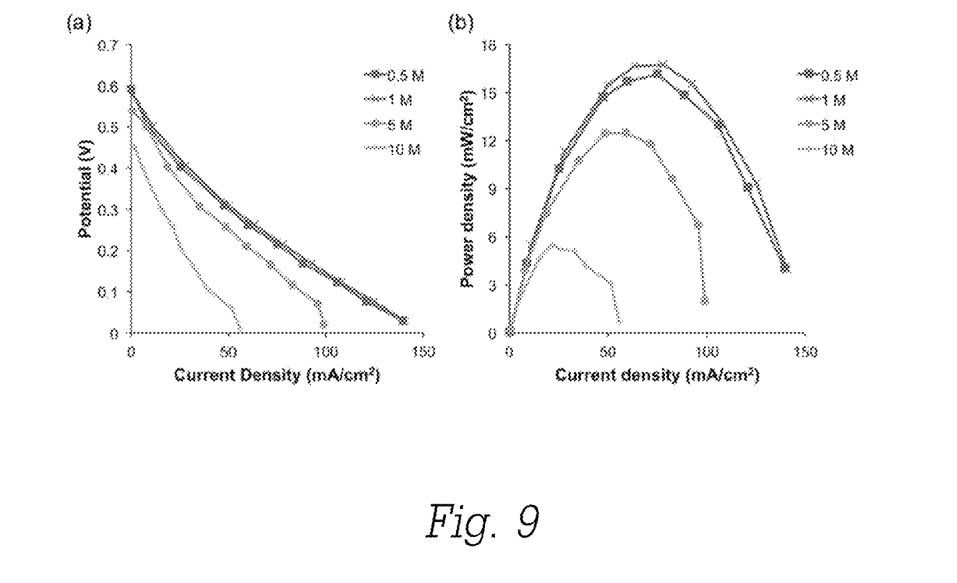
FIG. 9(a) is a graph of potential vs. current density for 4 different fuel concentrations using a test apparatus similar to that illustrated in FIG. 1, and described below.
FIG. 9(b) is a graph of power density vs. current density for the 4 different fuel concentrations shown in FIG. 8(a).

Finally, the performance of the test fuel cell was tested using different concentrations of HCOOH fuel mixed with 1 M $H_2SO_4$ electrolyte, and the results are presented in the polarization and power density curves shown in FIGS. 9(a) and 9(b), respectively. First, the 1.0 M HCOOH fuel concentration produced an OCP of 0.59 V and 16.7 mW/cm$^2$ of peak power density. Next, the 0.5 M HCOOH fuel concentration produced an OCP of 0.55 V and also reached a similar value of 16.1 mW/cm$^2$. At the higher fuel concentrations of 5 M and 10 M HCOOH, the OCP dropped to 0.54 V and 0.45 V, respectively, and the current density output was decreased due to a mixing issue at the cathode. The OCP in the test fuel cell is lower relative to other formic acid fuel cells utilizing a membrane electrode assembly (or nonmixed fuel and oxidant) due to its mixed reactant nature. Still, the peak power density of the test fuel cell compares quite favorably to other direct formic acid fuel cells (DFAFCs) (i.e., fuel flowing by an external pump) utilizing quiescent air as an oxygen source. For example, the 16.7 mW/cm$^2$ of the test fuel cell is comparable to the ~12 mW/cm$^2$ of peak power density obtained from a silicon fabricated MEA using platinum as the cathode catalyst, and higher than the ~8 mW/cm$^2$ of peak power density obtained using RuSeW as the fuel-tolerant cathode catalyst along with a fuel mixed with air in a vaporizer.

Accordingly, a self-pumping, membraneless fuel cell has been provided, along with data showing the general performance characteristics on a test fuel cell fabricated in accordance with one embodiment of the present invention. Without any ancillary components or an MEA, the fuel cell provides performance similar to or better than other reported DFAFCs which use an external fuel pump and/or an MEA.

While embodiments of the present invention have been shown and described, various modifications may be made without departing from the scope of the present invention. For example, those of ordinary skill in the art will recognize that the materials for the various components such as the catalysts, venting membranes, substrates, etc, the geometric configurations, and the fuels and electrolytes utilized may be modified. The invention, therefore, should not be limited, except to the following claims, and their equivalents.

What is claimed is:

1. A fuel cell device comprising:
   a channel having a first side and a second side, an inlet coupled to a solution comprising a mixture of a fuel and an electrolyte, an outlet downstream of the inlet, and a bubble generating region between the inlet and the outlet;
   the first side of the channel comprising an anode, the anode having a first catalyst comprising one of platinum or palladium for oxidizing the fuel within the channel;
   the second side of the channel comprising an air-breathing cathode, the air-breathing cathode having a second catalyst comprising one of platinum, palladium, or nickel for reducing oxidant within the channel;
   a one-way valve in communication with the channel, the one-way valve located upstream of the bubble generating region;
   a vent in communication with the channel, the vent disposed over a portion of the channel downstream of the bubble generating region; and
   wherein the mixture of fuel and electrolyte occupies substantially all of the channel between the cathode and the anode except for any space within the channel occupied by bubbles and wherein the fuel cell device has an open circuit potential of at least 0.4 V.

2. The device of claim 1, wherein the fuel is oxidized at the anode by the first catalyst, producing carbon dioxide bubbles which are used to self-pump the mixture of the fuel and the electrolyte and ions which are reduced at the cathode by the second catalyst.

3. The device of claim 1, wherein the second catalyst is formed from a different catalytic material than the first catalyst.

4. The device of claim 1, wherein the one-way valve comprises a plurality of wetting capillaries.

5. The device of claim 1, wherein the one-way valve comprises a partial obstruction disposed within the channel.

6. The device of claim 1, wherein the vent comprises a non-wetting venting membrane.

7. The device of claim 1, wherein the vent comprises a non-wetting porous membrane.

8. The device of claim 1, wherein the channel diverges in a downstream direction along the bubble generating region.

9. The device of claim 1, wherein the first catalyst comprises palladium.

10. The device of claim 9, wherein the second catalyst comprises platinum.

11. The device of claim 1, wherein the first catalyst comprises platinum.

12. The device of claim 1, wherein the second catalyst comprises palladium.

13. The device of claim 1, wherein the second catalyst comprises nickel.

14. The device of claim 1, wherein the first catalyst and the second catalyst are formed from the same material.

15. A fuel cell comprising:
   a plurality of the fuel cell devices of claim 1 operably coupled together.

16. A fuel cell system comprising:
   a reservoir containing a solution comprising a mixture of fuel and an electrolyte;
   a plurality of fuel cells, each fuel cell comprising:
      a channel having a first side and a second side, an inlet coupled to the reservoir, an outlet downstream of the inlet, and a bubble generating region between the inlet and the outlet;
      the first side of each channel comprising an anode, the anode having a first catalyst comprising one of platinum or palladiumfor oxidizing a fuel within the channel;
      the second side of each channel comprising an air-breathing cathode, the air-breathing cathode having a second catalyst comprising one of platinum, palladium, or nickel for reducing oxidant within the channel;
      a one-way valve in communication with the channel, the one-way valve located upstream of the bubble generating region;
      a vent in communication with the channel, the vent disposed over a portion of the channel downstream of the bubble generating region; and
      wherein the mixture of fuel and electrolyte occupies substantially all of the channel of each of the plurality of fuel cells between the cathode and the anode except for any space within the channel occupied by bubbles and wherein each fuel cell has an open circuit potential of at least 0.4 V.

17. The fuel cell system of claim 16, wherein the channel for each fuel cell is fabricated on a single piece of substrate.

* * * * *